United States Patent
Wang

(10) Patent No.: US 11,141,863 B2
(45) Date of Patent: Oct. 12, 2021

(54) CLEANING ROBOT CAPABLE OF DETECTING 2D DEPTH INFORMATION AND OPERATING METHOD THEREOF

(71) Applicant: PixArt Imaging Inc., Hsin-Chu County (TW)

(72) Inventor: Guo-Zhen Wang, Hsin-Chu County (TW)

(73) Assignee: PIXART IMAGING INC., Hsin-Chu County (TW)

( * ) Notice: Subject to any disclaimer, the term of this patent is extended or adjusted under 35 U.S.C. 154(b) by 450 days.

(21) Appl. No.: 16/157,096

(22) Filed: Oct. 11, 2018

(65) Prior Publication Data

US 2020/0114517 A1    Apr. 16, 2020

(51) Int. Cl.
| | |
|---|---|
| *B25J 9/00* | (2006.01) |
| *B25J 9/16* | (2006.01) |
| *A47L 11/40* | (2006.01) |
| *B25J 11/00* | (2006.01) |
| *A47L 9/28* | (2006.01) |

(52) U.S. Cl.
CPC ........... *B25J 9/1697* (2013.01); *A47L 9/2826* (2013.01); *A47L 11/4061* (2013.01); *B25J 9/1666* (2013.01); *B25J 11/0085* (2013.01); *A47L 2201/04* (2013.01)

(58) Field of Classification Search
CPC .... B25J 9/1697; B25J 9/1666; B25J 11/0085; A47L 11/4061; A47L 9/2826; A47L 2201/04; A47L 9/30; A47L 2201/06; A47L 11/24; A47L 11/40; A47L 11/4002; A47L 11/4011; G01S 17/48; G01S 7/4815; G01S 17/931; G01S 17/88; G05D 1/0238; G05D 2201/0203; G05D 1/021; G05D 1/0246

See application file for complete search history.

(56) References Cited

U.S. PATENT DOCUMENTS

| | | | |
|---|---|---|---|
| 6,597,430 B1* | 7/2003 | Nishi | G03F 7/70583 |
| | | | 355/53 |
| 2016/0098039 A1* | 4/2016 | Noh | G01S 7/491 |
| | | | 701/28 |

FOREIGN PATENT DOCUMENTS

| | | |
|---|---|---|
| CN | 101430477 A | 5/2009 |
| CN | 108196555 A | 6/2018 |
| CN | 207444899 U | 6/2018 |

* cited by examiner

*Primary Examiner* — Ian Jen
(74) *Attorney, Agent, or Firm* — Hauptman Ham, LLP

(57) ABSTRACT

There is provided a cleaning robot including a light source module, an image sensor and a processor. The light source module projects a line pattern and a speckle pattern toward a moving direction. The image sensor captures an image of the line pattern and an image of the speckle pattern. The processor calculates one-dimensional depth information according to the image of the line pattern and calculates two-dimensional depth information according to the image of the speckle pattern.

22 Claims, 9 Drawing Sheets

ND OPERATING METHOD THEREOF

BACKGROUND

1. Field of the Disclosure

This disclosure generally relates to an electronic device capable of detecting depth information and, more particularly, to a cleaning robot capable of detecting two-dimensional depth information and calculating a wall distance, and an operating method of the cleaning robot.

2. Description of the Related Art

Nowadays, a trend is irreversible in factory to replace human workers by machines. Even at home, because one can have more free time by using robots to do homework, various types of family robots are also created during which the cleaning robot is most well-known and popular.

The cleaning robot has sensors for detecting obstacles in front. However, the conventional cleaning robot can only detect one-dimensional depth information but is unable to identify the appearance of the obstacles.

In addition, the cleaning robot is also required to be able to calculate a wall distance when cleaning along a wall so as to efficiently clean corners. The conventional cleaning robot adopts multiple different sensors to respectively detect the front distance and the wall distance. However, field of views between said different sensors general have dead zones unable to detect any obstacle such that the conventional cleaning robot frequently bumps to different obstacles during operation. Not only generating noises, the bumping can further cause damages to furniture and the robot itself to shorten the service lifetime thereof.

Accordingly, it is necessary to provide a cleaning robot capable of calculating both one-dimensional and two-dimensional depth information according to images captured by an image sensor, and further calculating a distance from a side wall accordingly.

SUMMARY

The present disclosure provides a cleaning robot capable of detecting two-dimensional depth information, and an operating method of the cleaning robot.

The present disclosure further provides a cleaning robot capable of detecting a front obstacle and a distance from a side wall by using a same image sensor, and an operating method of the cleaning robot.

The present disclosure further provides a cleaning robot capable of detecting a distance from a transparent obstacle.

The present disclosure provides a cleaning robot including a first diffractive optical element, a first light source, a second diffractive optical element, a second light source and an image sensor. The first light source is configured to project a line pattern through the first diffractive optical element. The second light source is configured to project a speckle pattern through the second diffractive optical element. The image sensor is configured to acquire an image of the line pattern and an image of the speckle pattern.

The present disclosure further provides a cleaning robot including a first diffractive optical element, a first light source, a first image sensor, a second diffractive optical element, a second light source and a second image sensor. The first light source is configured to project a line pattern through the first diffractive optical element. The first image sensor is configured to capture an image of the line pattern. The second light source is configured to project a speckle pattern through the second diffractive optical element. The second image sensor is configured to capture an image of the speckle pattern.

The present disclosure further provides an operating method of a cleaning robot. The cleaning robot includes a light source, a diffractive optical element, an image sensor and a processor. The light source projects a line pattern through the diffractive optical element. The operating method includes the steps of: projecting a line pattern toward a first direction when the cleaning robot moves toward an obstacle; calculating, by the processor, a relative distance from the obstacle according to a first image of the line pattern captured by the image sensor; controlling, by the processor, the cleaning robot to turn to move parallel to the obstacle when the relative distance is identical to a predetermined distance; projecting the line pattern toward a second direction when the cleaning robot moves parallel to the obstacle; and maintaining, by the processor, a parallel distance between the cleaning robot and the obstacle to the predetermined distance according to a second image of the line pattern captured by the image sensor.

The present disclosure further provides a cleaning robot including a diffractive optical element, a laser light source, a light emitting diode, an image sensor and a processor. The laser light source is configured to project a line pattern toward a moving direction through the diffractive optical element. The light emitting diode is configured to illuminate light with an emission angle toward the moving direction. The image sensor is configured to acquire an image with a field of view toward the moving direction. The processor is configured to control lighting of the laser light source and the light emitting diode, wherein when identifying that a signal-to-noise ratio of the image containing the line pattern exceeds a threshold range, the processor is configured to identify a distance of an obstacle according to an area of a bright region in the image which is acquired when the light emitting diode is lighting.

The present disclosure further provides a cleaning robot including a light source module and an image sensor. The light source module is configured to provide a line pattern and a speckle pattern. The image sensor is configured to acquire an image of the line pattern and an image of the speckle pattern.

In the cleaning robot and the operating method of the present disclosure, according to different applications, the line pattern and the speckle pattern are overlapped or not overlapped with each other, and the line pattern and the speckle pattern are generated simultaneously or sequentially.

In the cleaning robot and the operating method of the present disclosure, according to different applications, the light source module emits light of a single dominant wavelength to generate the line pattern and the speckle pattern, or the light source module emits light of different dominant wavelengths to respectively generate the line pattern and the speckle pattern.

In the cleaning robot and the operating method of the present disclosure, the image sensor includes a linear pixel array. The processor controls the cleaning robot to move in a direction parallel to an obstacle at a substantially fixed wall distance according to an image size of the obstacle captured by the linear pixel array.

In the cleaning robot and the operating method of the present disclosure, the image sensor includes a wide-angle lens to allow a field of view of the image sensor to be larger than a diameter of the cleaning robot. Accordingly, when the cleaning robot operates in a direction parallel to a wall, the image sensor still can continuous detect an image of the side wall to identify whether a wall distance is changed. Therefore, the cleaning robot of the present disclosure needs not to adopt another sensor to detect the wall distance, and the problem of unable to detect dead zones is eliminated.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

Figure 1:
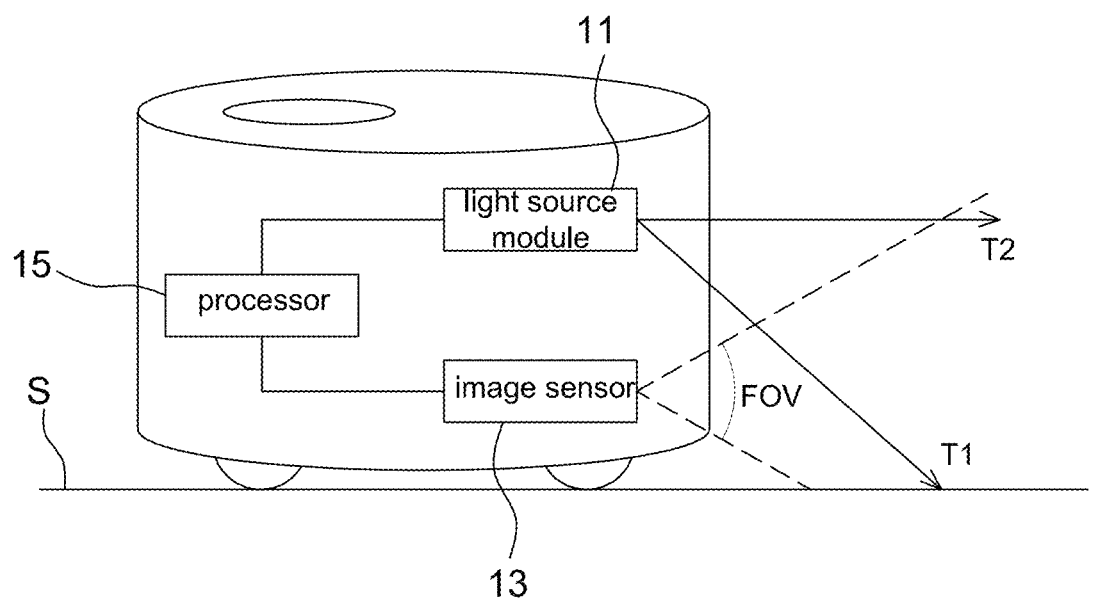
FIG. 1 is a schematic block diagram of a cleaning robot according to one embodiment of the present disclosure.

Referring to FIG. 1, it is a schematic block diagram of a cleaning robot 100 according to one embodiment of the present disclosure. The cleaning robot 100 is used to clean a work surface S (e.g., a floor) by operating on the work surface S. The cleaning method can use the conventional method, and details thereof are not described herein.

The cleaning robot 100 of the present disclosure includes a light source module 11, an image sensor 13 and a processor 15 electrically coupled to the light source module 1 land the image sensor 13. The light source module 11 includes at least one active light source, and is used to provide or project a line pattern T1 and a speckle pattern T2 toward a front of a moving direction (e.g., the right of FIG. 1) of the cleaning robot 100. In one non-limiting embodiment, the line pattern T1 is projected downward on the work surface S and the speckle pattern T2 is projected in a front direction, but the present disclosure is not limited thereto. As long as the line pattern T1 is projected with a tilt angle (i.e. not parallel to the work surface S), the processor 15 is able to calculate a relative distance from the projected object by using triangulation method. More specifically, in the present disclosure, a projected angle of the line pattern T1 is different from a projected angle of the speckle pattern T2.

Figure 2:
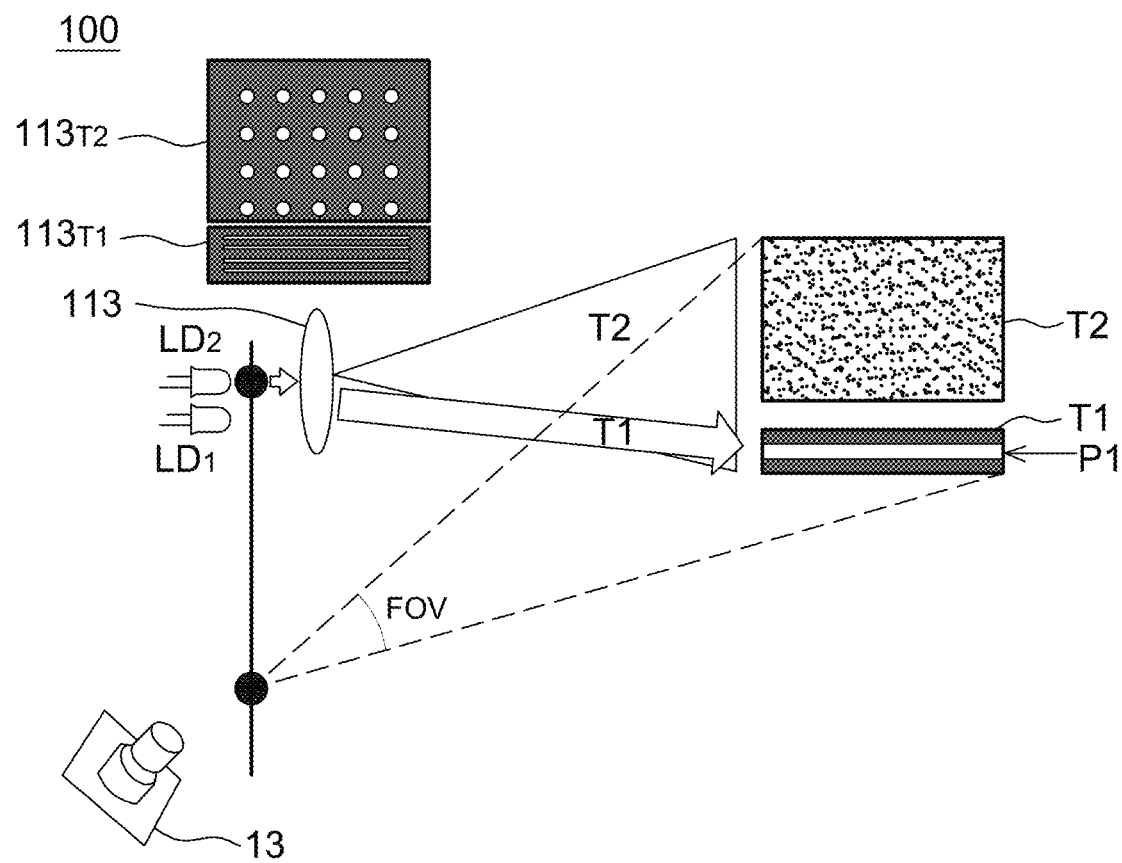
FIG. 2 is an operational schematic diagram of a cleaning robot according to one embodiment of the present disclosure.

Referring to FIG. 2, it is an operational schematic diagram of a cleaning robot 100 according to one embodiment of the present disclosure. In this embodiment, the light source module 11 includes at least one coherent light source (e.g., a laser diode) or a partially coherent light source, and at least one diffractive optical element (DOE) 113 used to generate a line pattern T1 and a speckle pattern T2. For example, FIG. 2 shows that the diffractive optical element 113 is composed of a first diffractive optical element $113_{T1}$ and a second diffractive optical element $113_{T2}$.

FIG. 2 shows that the light source module 11 includes a first light source LD1, the first diffractive optical element $113_{T1}$, a second light source LD2 and the second diffractive optical element $113_{T2}$. In one non-limiting embodiment, the first diffractive optical element $113_{T1}$ and the second diffractive optical element $113_{T2}$ are combined together (e.g., by glue) to form a module to be easily arranged in front of the light source. In other arrangement, the first diffractive optical element $113_{T1}$ and the second diffractive optical element $113_{T2}$ are disposed at different positions.

The first light source LD1 is arranged opposite to the first diffractive optical element $113_{T1}$ and used to emit light to pass through the first diffractive optical element $113_{T1}$ to project a line pattern T1 in front of a moving direction of the cleaning robot 100. The second light source LD2 is arranged opposite to the second diffractive optical element $113_{T2}$ and used to emit light to pass through the second diffractive optical element $113_{T2}$ to project a speckle pattern T2 in front of the moving direction of the cleaning robot 100, wherein sizes and shapes of the speckles in the speckle pattern are not particularly limited as long as a plurality of speckles of identical or different shapes are generated on a projected surface.

FIG. 2 shows that the cleaning robot 100 includes a single image sensor 13 which has a field of view FOV covering regions of the line pattern T1 and the speckle pattern T2. The image sensor 13 is a CMOS image sensor, a CCD image sensor or other elements capable of detecting light energy and generating electrical signals. The image sensor 13 is used to capture and acquire an image of the line pattern T1 and an image of the speckle pattern T2, and then send the captured images to the processor 15 for post-processing, e.g., identifying the distance (so called depth) and the shape (so called two-dimensional depth information) of the obstacle.

Figure 3:
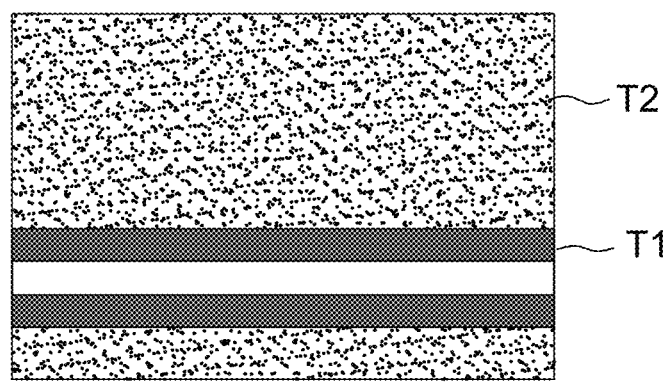
FIG. 3 is a schematic diagram of a pattern arrangement projected by a cleaning robot according to one embodiment of the present disclosure.

In FIG. 2, although the line pattern T1 is shown to be formed outside of a region of the speckle pattern T2, the present disclosure is not limited thereto. In FIG. 3, the line pattern T1 is shown to be formed within a region of the speckle pattern T2. In FIGS. 2 and 3, the positional relationship and the scale ratio between the line pattern T1 and the speckle pattern T2 are only intended to illustrate but not to limit the present disclosure. It is possible to form the line pattern T1 at the upper side, left side or right side of the speckle pattern T2 as long as they are detectable by the image sensor 13.

Figure 4A:
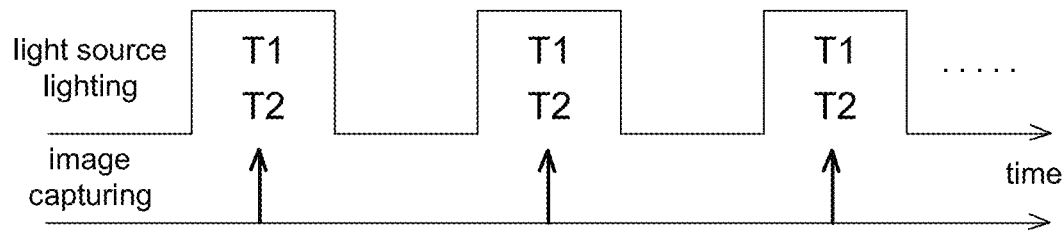
FIGS. 4A-4C are timing diagrams of projecting two different patterns by a cleaning robot according to one embodiment of the present disclosure.
Figure 4B:
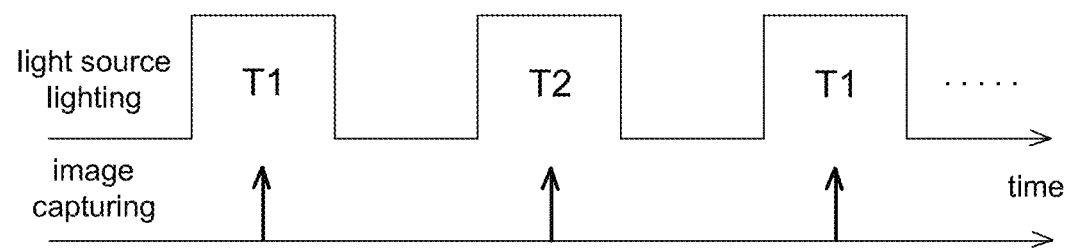
Figure 4C:
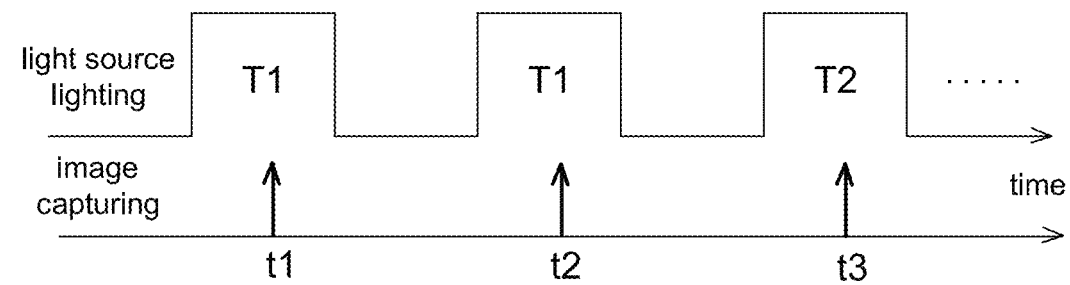

Referring to FIGS. 4A-4C, they are timing diagrams of two different patterns T1 and T2 projected by the cleaning robot 100 of the present disclosure.

When the line pattern T1 and the speckle pattern T2 are overlapped with each other as shown in FIG. 3, in one embodiment the first light source LD1 and the second light source LD2 are turned on sequentially (as shown in FIG. 4B) to respectively generate the line pattern T1 and the speckle pattern T2 at different time points. In this embodiment, as the light sources are lighted separately, the line pattern T1 and the speckle pattern T2 do not interfere with each other, and thus the first light source LD1 and the second light source LD2 have identical or different dominant wavelengths without particular limitations.

In another embodiment, the line pattern T1 and the speckle pattern T2 are overlapped with each other and the first light source LD1 and the second light source LD2 are turned on simultaneously (as shown in FIG. 4A). In order to allow the line pattern T1 and the speckle pattern T4 to not interfere with each other, preferably a dominate wavelength of the first light source LD1 is different from a dominant wavelength of the second light source LD2. In this case, a part of pixels of the image sensor 13 are covered by a light filter for detecting the line pattern T1, and the other part of pixels are covered by another light filter for detecting the speckle patter T2. The method for forming light filters on pixels is known to the art, and thus details thereof are not described herein.

In the embodiment of FIG. 2, as the line pattern T1 and the speckle pattern T2 are not overlapped, they do not interfere with each other. Accordingly, the first light source LD1 and the second light source LD2 are arranged, according to different applications, to be turned on simultaneously or sequentially, and have identical or different dominant wavelengths.

The processor 15 is, for example, a digital signal processor (DSP), a microcontroller unit (MCU), a central processing unit (CPU) or an application specific integrated circuit (ASIC) that identify, by software and/or hardware, whether there is an obstacle (e.g., wall, table legs, chair legs or lower part of other furniture or home appliances) according to an image containing the line pattern T1, and identify the appearance (referred to two-dimensional depth information) of the obstacle according to an image containing the speckle pattern T2.

For example referring to FIG. 2, if there is no obstacle within the FOV of the image sensor 13, a line section in the image of the line pattern T1 captured by the image sensor 13 is a horizontal line at a position P1.

When an obstacle smaller than a range of the FOV exists within the FOV, a part of the line section in the image of the line pattern T1 appears at a different height (i.e. not at the position P1). Accordingly, the processor 15 identifies that there is an obstacle in front according to line sections at different positions.

When an obstacle larger than a range of the FOV exists within the FOV, the whole of the line section in the image of the line patter T1 appears at a different height, e.g., moving upward or downward from the position P1 which is determined according to relative positions between the light source module 11 and the image sensor 13. Accordingly, the processor 15 identifies that there is an obstacle in front according to a position shifting of the line section. In addition, the processor 15 further identifies a distance from the obstacle according to the height (or a shifting amount) of the line section in the image of the line pattern T1. For example, the cleaning robot 100 further includes a memory for storing a relationship between positions of the line section and distances from the obstacle (e.g., forming a look up table, LUT). When identifying a position of the line section in the image of the line pattern T1, the processor 15 compares the calculated position with the stored information to obtain a distance of the obstacle (also adaptable to the case that a part of the line section appears at different positions).

To reduce the consumption power and increase the accuracy, when the processor 15 identifies no obstacle in the image of the line pattern T1, preferably only the first light source LD1 is turned on but the second light source LD2 is not turned on. For example, FIG. 4C shows that the processor 15 does not detect an obstacle at a first time t1, and thus only the first light source LD1 is turned on at a second time t2. When an obstacle is detected at the second time t2, the second light source LD2 is turned on at a third time t3 (the first light source LD1 being turned on optionally) to cause the image sensor 13 to acquire an image of the speckle pattern T2. The processor 15 then identifies an appearance of the obstacle according to the image of the speckle pattern T2. For example, the processor 15 calculates the appearance of the obstacle as two-dimensional depth information according to the variation of sizes and shapes of speckles on a surface of the obstacle, e.g., by comparing with the stored information. The two-dimensional depth information is used as data for avoiding bumping an object and constructing a map of the cleaned area.

In the above embodiment, a cleaning robot 100 having only one image sensor 13 is taken as an example to illustrate the present disclosure, and the image sensor 13 captures images of both the line pattern T1 and the speckle pattern T2. In another non-limiting embodiment, the cleaning robot 100 includes a first image sensor for capturing an image of the line pattern T1 and a second image sensor for capturing an image of the speckle pattern T2 to reduce the interference therebetween. In this embodiment, arrangements of the first light source LD1, the first diffractive optical element $113_{T1}$, the second light source LD2 and the second diffractive optical element $113_{T2}$ are not changed, and thus details thereof are not repeated herein.

The first image sensor and the second image sensor acquire images respectively corresponding to operations of the first light source LD1 and the second light source LD2. For example, the first light source LD1 and the second light source LD2 emit light sequentially, and the first image sensor and the second image sensor respectively capture images of the line pattern T1 and the speckle patter T2 corresponding to the lighting of the first light source LD1 and the second light source LD2. In this embodiment, the line pattern T1 and the speckle pattern T2 are overlapped or not overlapped with each other, and dominant wavelengths of the first light source LD1 and the second light source LD2 are identical or different.

In another embodiment, the first light source LD1 and the second light source LD2 are turned on simultaneously. If the line pattern T1 and the speckle pattern T2 are not overlapped with each other, a dominant wavelength of the first light source LD1 is identical to or different from that of the second light source LD2 without particular limitations. However, if the line pattern T1 and the speckle pattern T2 are overlapped with each other, the dominant wavelength of the first light source LD1 is preferably different from that of the second light source LD2 to avoid interference. In this case, the first image sensor has a light filter to block light instead of the dominant wavelength of the first light source LD1, and the second image sensor has a light filter to block the light instead of the dominant wavelength of the second light source LD2.

The processor 15 is electrically coupled to the first image sensor and the second image sensor, and used to identify whether there is an obstacle according to the image of the line pattern T received from the first image sensor, and identify the appearance of the obstacle according to the image of the speckle pattern T2 received from the second image sensor.

Similarly, to reduce the power consumption and increase the accuracy, when the processor 15 identifies that there is no obstacle in a moving direction according to the image of the line patter T1, only the first light source LD1 and the first image sensor are turned on, but the second light source LD2 and the second image sensor are not turned on as shown in FIG. 4C. The second light source LD2 and the second image sensor are turned on only when an obstacle is detected by the processor 15. When the appearance of the obstacle is depicted by the processor 15 according to the image of the speckle pattern T2, the second light source LD2 and the second image sensor are turned off.

In another embodiment, when moving in a direction parallel to the obstacle (e.g., a wall) at a predetermined distance, the cleaning robot 100 of the present disclosure captures the image of the line pattern T1 using the same image sensor 13 to maintain a wall distance without using other sensors.

Figure 5:
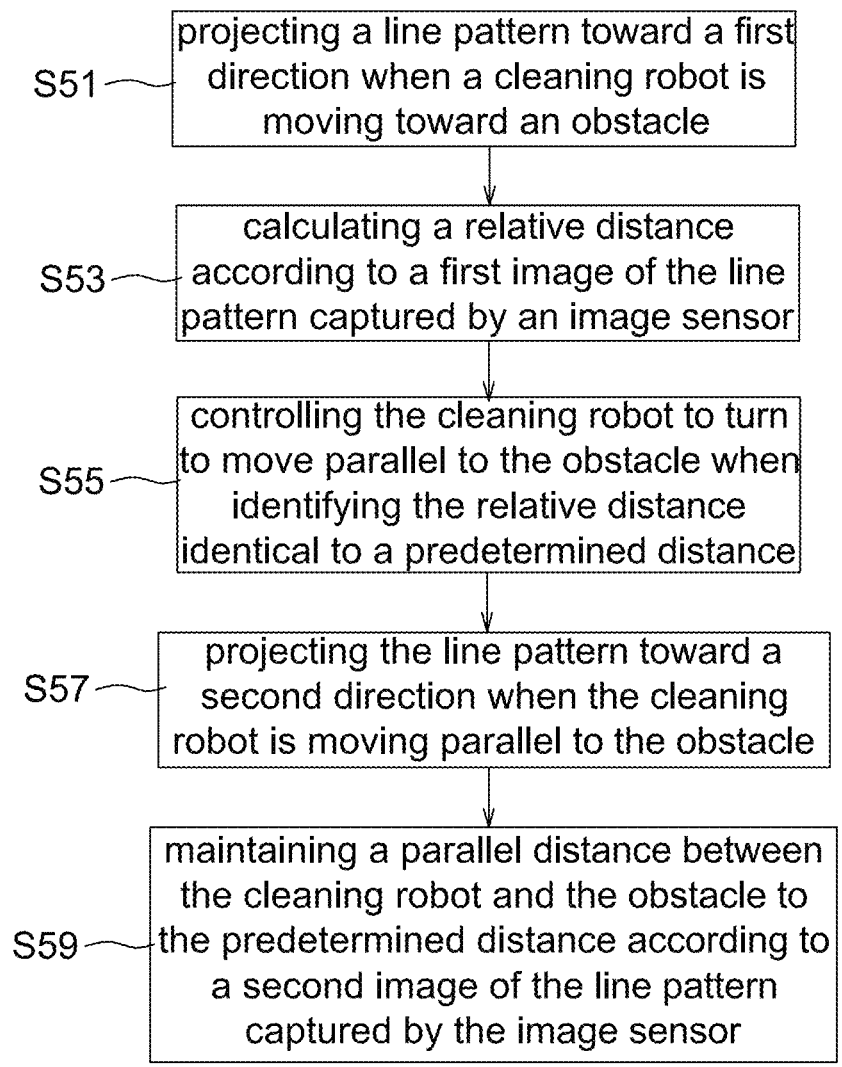
FIG. 5 is a flow chart of an operating method of a cleaning robot according to one embodiment of the present disclosure.

For example referring to FIG. 5, it is a flow chart of an operating method of a cleaning robot 100 according to one embodiment of the present disclosure. The operating method includes the steps of: projecting a line pattern toward a first direction when a cleaning robot moves toward an obstacle (Step S51); calculating, by a processor, a relative distance from the obstacle according to a first image of the line pattern captured by an image sensor (Step S53); controlling, by the processor, the cleaning robot to turn to move parallel to the obstacle when the relative distance is identical to a predetermined distance (Step S55); projecting the line pattern toward a second direction when the cleaning robot moves parallel to the obstacle (Step S57); and maintaining, by the processor, a parallel distance between the cleaning robot and the obstacle to the predetermined distance according to a second image of the line pattern captured by the image sensor (Step S59).

Figure 6A:
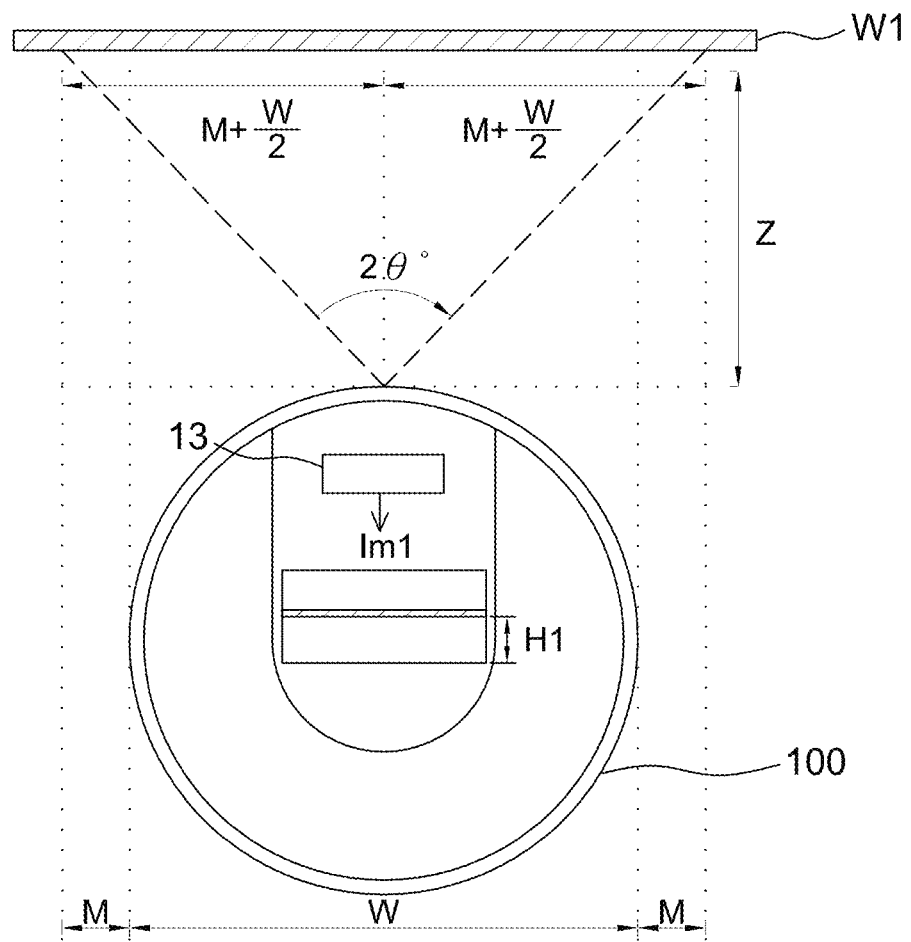
FIGS. 6A-6B are operational schematic diagrams of a cleaning robot according to one embodiment of the present disclosure.
Figure 6B:
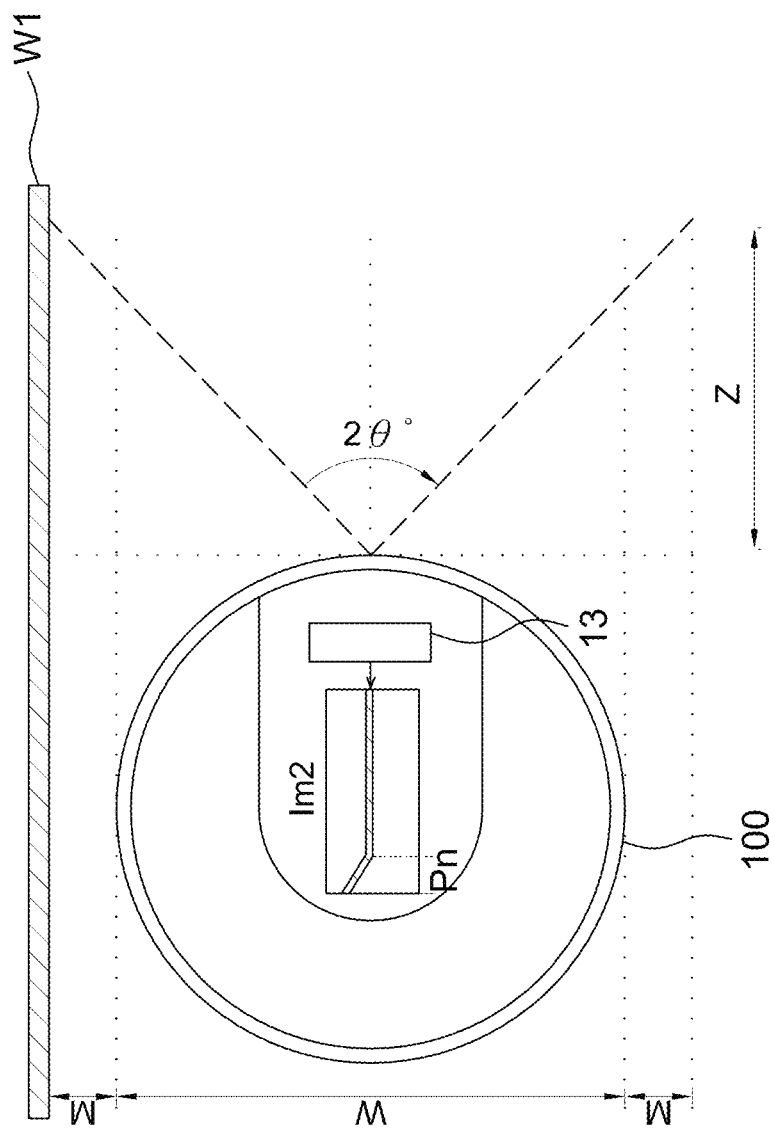

The operating method herein is adaptable to the above embodiments having a single image sensor and two image sensors, respectively. Referring to FIGS. 6A-6B together, one embodiment of the operating method of the present disclosure is described hereinafter.

Step S51: Firstly, the cleaning robot 100 is moving toward an obstacle W1 (e.g., a wall). The first light source LD1 emits light to go through the first DOE $113_{T1}$ to project a line pattern T1 toward a first direction (i.e., toward the obstacle W1). In this embodiment, it is assumed that a projected distance of the line pattern T1 is Z. The image sensor 13 then captures a first image Im1 containing the line pattern T1 as shown in FIG. 6A.

As mentioned above, when the processor 15 identifies that there is at least one obstacle in the captured first image Im1 (the line section therein being moved or broken), the operating method further includes the steps of: controlling the second light source LD2 to emit light to go through the second DOE $113_{T2}$ to project a speckle pattern T2 toward the obstacle W1; and processing, by the processor 15, the image containing the speckle pattern T2 to obtain two-dimensional distance information, and details thereof have been illustrated above and thus are not repeated herein.

Step S53: Next, the processor 15 calculates a position (e.g., the position H1 shown in FIG. 6A) of a line section (e.g., filled with slant line) in the first image Im1 containing the line pattern T1, and compares the position with the information (e.g., LUT between positions and distances) stored in the memory to obtain a relative distance from the obstacle W1.

Step S55: During the cleaning robot 100 moving toward the obstacle W1, the processor 15 calculates the relative distance at a predetermined frequency (e.g., corresponding to the image capturing frequency). When identifying that the relative distance is shortened to be equal to a predetermined distance (e.g., a wall distance M which is set before shipment), the processor 15 controls the cleaning robot 100 to turn (left or right) the moving direction to be parallel to the obstacle W1, e.g., FIG. 6B showing a right turn being performed.

Step S57: Next, the cleaning robot 100 moves in a direction parallel to the obstacle W1 at a predetermined distance M therefrom as shown in FIG. 6B. Meanwhile, the first light source LD1 emits light to pass through the first DOE $113_{T1}$ to project the line pattern T1 toward a second direction (i.e. a direction parallel to the obstacle W1) at a distance Z.

Step S59: To maintain a parallel distance between the cleaning robot 100 and the obstacle W1 to be substantially identical to the predetermined distance M, the processor 15 continuously calculates the parallel distance according to a second image Im2 (referring to FIG. 6B) containing the line pattern T1 captured by the image sensor 13.

In one non-limiting embodiment, the image sensor 13 includes a linear pixel array (i.e. a length thereof much larger than a width) for capturing the second image Im2 Meanwhile, the image sensor 13 preferably has a wide-angle lens to allow a field of view (shown as 2θ) the image sensor 13 to be larger than a diameter of the cleaning robot 100. In this way, when the cleaning robot 100 moves in a direction parallel to the obstacle W1, the second image Im2 acquired by the image sensor 13 still contains the obstacle image, e.g., the region Pn shown in FIG. 6B indicating an image of the obstacle W1. When the cleaning robot 100 moves in a direction parallel to the obstacle W1 by the predetermined distance M, the image size (or pixel number) Pn will be substantially fixed, but when the parallel distance changes, the image size Pn also changes. Accordingly, the processor 15 further identifies whether the parallel distance is identical to the predetermined distance M according to the image size Pn of the obstacle W1 detected by the linear pixel array. When the parallel distance is not equal to the predetermined distance M, the processor 15 controls the cleaning robot 100 to adjust its moving direction to keep the predetermined distance M from the obstacle W1.

The method of controlling a moving direction of the cleaning robot 100 (i.e. controlling wheels by a motor) is known to the art and not a main objective of the present disclosure, and thus details thereof are not described herein.

In one non-limiting embodiment, the wide field of view of the image sensor 13 is determined according to a size (e.g., diameter W) of the cleaning robot 100, a projected distance Z of the line pattern T1 and a wall distance (i.e., the predetermined distance M) by triangular calculation, e.g., θ=arctan ((M+W/2)/Z). If the size W of the cleaning robot 100 is larger, the field of view 2θ becomes larger. In addition, the processor 15 preferably has the function of distortion compensation to eliminate the image distortion caused by the wide-angle lens.

Figure 7:
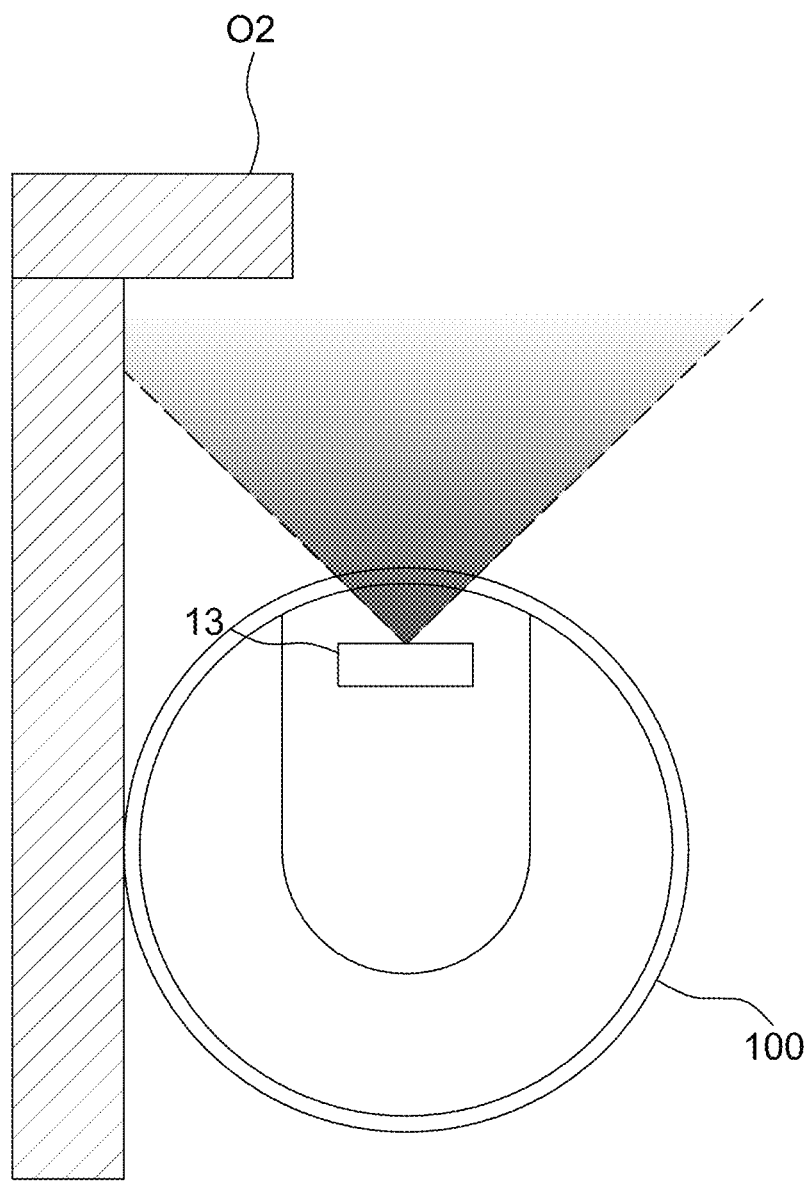
FIG. 7 is another operational schematic diagram of a cleaning robot according to one embodiment of the present disclosure.

In addition, as shown in FIG. 7, as the cleaning robot 100 of the present disclosure adopts a wide-angle lens, compared with the conventional robot using multiple sensors, the cleaning robot 100 can solve the problem of the existence of undetectable dead zone (e.g., FIG. 7 showing the image sensor 13 detecting an object O2 at front-left corner which is not detectable in the conventional robot) so as to reduce the bumping of the cleaning robot 100 with obstacles to prolong the service lifetime.

It should be mentioned that the "wall distance" mentioned in the above embodiments is not limited to a distance from a "wall". The "wall distance" is a distance from any obstacle having a large area such that the cleaning robot 100 cleans in a direction parallel to it.

Figure 8:
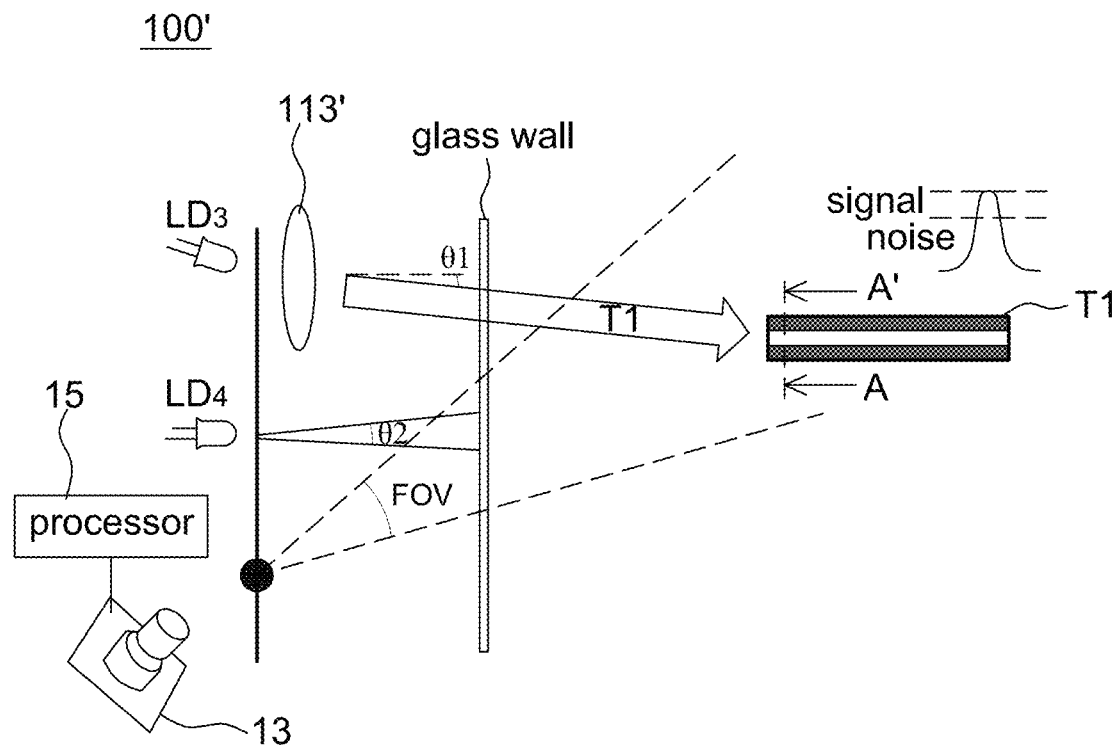
FIG. 8 is an operational schematic diagram of a cleaning robot according to an alternative embodiment of the present disclosure.

When an obstacle is transparent (e.g., a glass wall), a line pattern T1 projected by a cleaning robot can penetrate the transparent obstacle such that the processor 15 may not identify a relative distance from the transparent obstacle correctly. Therefore, the cleaning robot can bump into the transparent obstacle to generate noises and cause damage to the device itself or to the wall. Accordingly, the present disclosure further provides a cleaning robot 100' capable of identifying a relative distance from a transparent obstacle as shown in FIG. 8, and the cleaning robot 100' is turned its direction when the relative distance reaches a predetermined distance.

The cleaning robot 100' of the present disclosure includes a laser light source LD3, a diffractive optical element 113', a light emitting diode LD4, an image sensor 13 and a processor 15. In one non-limiting embodiment, the laser light source LD3 is implemented by the above first light source LD1, and the diffractive optical element 113' is implemented by the above first diffractive optical element $113_{T1}$, and thus details thereof are not repeated herein. In this embodiment, the laser light source LD3 projects a line pattern T1 toward a moving direction through the diffractive optical element 113'.

A dominant wavelength of light emitted by the light emitting diode LD4 is identical to or different from a dominant wavelength of light (e.g., 850 nm to 940 nm, but not limited to) emitted by the laser light source LD3. The light emitting diode LD4 illuminates light with an emission angle θ2 toward the moving direction. In one non-limiting embodiment, the laser light source LD3 projects a light pattern T1 toward the moving direction below a horizontal direction (i.e., having a dip angle θ1) such that when there is no obstacle in front of the cleaning robot 100', the line pattern T1 is projected on the ground on which the machine is moving. The light emitting diode LD4 illuminates light right ahead of the moving direction (i.e. no deep angle or elevation angle). In some embodiments, the light emitting diode LD4 is arranged to emit light toward the moving direction with a deep angle or an elevation angle smaller than 5 degrees.

The image sensor 13 is implemented by the above image sensor 13 which acquires images with a field of view FOV toward the moving direction. Accordingly, when the laser light source LD3 is lighting, the captured images contain an image of the line pattern T1. As mentioned above, the processor 15 calculates and identifies a relative distance form an obstacle according to an image of the line pattern T1 (e.g., according to the position P1 mentioned above).

The processor 15 is electrically coupled to the laser light source LD3 and the light emitting diode LD4 to control the laser light source LD3 and the light emitting diode LD4 to emit light in a predetermined frequency.

As mentioned above, this embodiment is used to identify a distance from a transparent obstacle. Accordingly, when there is no transparent obstacle in a moving direction of the cleaning robot 100', a signal-to-noise ratio (SNR) of an image (FIG. 8 showing an intensity distribution along line A-A') containing the line pattern T1 is within a predetermined threshold range (e.g., 50% to 70%, but not limited thereto). However, when there is a transparent obstacle in the moving direction of the cleaning robot 100', the signal-to-noise ratio of the image containing the line pattern T1 is lower than the predetermined threshold range. In addition, when there is a strong reflective obstacle in the moving direction of the cleaning robot 100', it is possible that the SNR of the image containing the line pattern T1 is higher than the predetermined threshold range. In this embodiment, when identifying that the SNR of the image containing the line pattern T1 exceeds (i.e. lower or higher than) the predetermined threshold range, the processor 15 identifies a distance from the obstacle according to an area of a bright region in the image captured when the light emitting diode LD4 is lighting.

Figure 9:
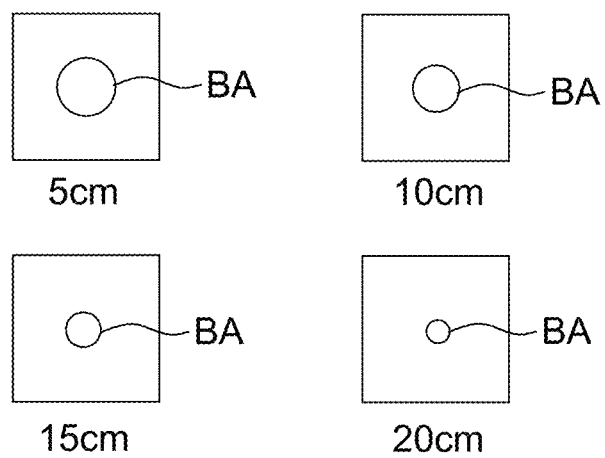
FIG. 9 is a schematic diagram of a bright region in an image associated with a light emitting diode captured by an image sensor in FIG. 8.

For example referring to FIG. 9, it shows a reflection image on a transparent obstacle captured by the image sensor 13 when the light emitting diode LD4 is emitting light, wherein the captured image contains a bright region BA associated with the light emitting diode LD4. It is seen from FIG. 9 that an area of the bright region BA has an opposite relationship with respect to a relative distance between the cleaning robot 100' and the transparent obstacle, i.e. the area of the bright region BA being smaller when the relative distance is farther. Accordingly, the processor 15 identifies a distance from the transparent obstacle according to the area of the bright region BA. For example, the processor 15 identifies the distance according to a lookup table (recorded in a memory) of the relationship between areas and corresponding relative distances. The bright region BA is determined according to pixels having a gray value larger than a threshold in the image.

In other words, in this embodiment, when the SNR of the image containing the line pattern T1 is within a predetermined threshold range, the processor 15 calculates a relative distance from the obstacle according to the image captured when the laser light source LD3 is emitting light; whereas, when the SNR of the image containing the line pattern T1 exceeds the predetermined threshold range, the processor 15 calculates a relative distance from the obstacle according to the image captured when the light emitting diode LD4 is emitting light. In one non-limiting embodiment, a dominant wavelength of light emitted by the light emitting diode LD4 is selected to have a higher reflectivity corresponding to a specific material (e.g., glass) to facilitate the distance detection.

Figure 10A:
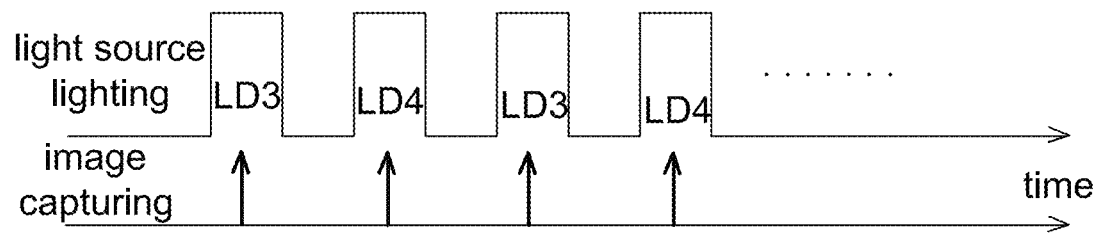
FIGS. 10A-10B are timing diagrams of lighting different light sources of the cleaning robot in FIG. 8.
Figure 10B:
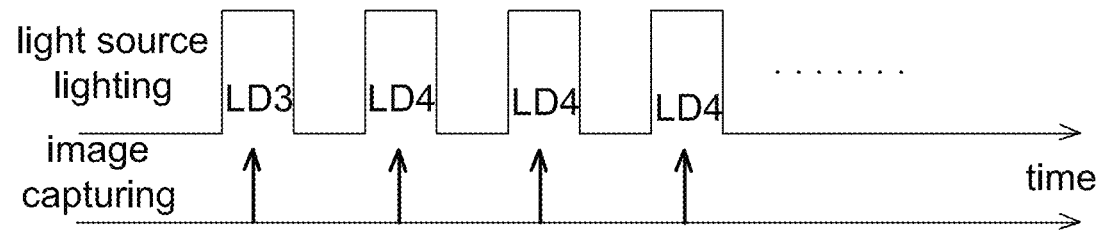

Referring to FIGS. 10A and 10B, in the embodiment of FIG. 8, the processor 15 firstly controls, in a normal mode, the laser light source LD3 to emit light at a lighting frequency, and calculates a relative distance from an obstacle according to the line pattern T1 in an image captured by the image sensor 13 (arrows in FIGS. 10A and 10B referred to capturing an image). When identifying that the SNR of the image containing the line pattern T1 is within a predetermined threshold range, the processor 15 only turns on the laser light source LD3 without turning on the light emitting diode LD4. When identifying that the SNR of the image containing the line pattern T1 exceeds the predetermined threshold range, the processor 15 alternatively turns on the laser light source LD3 and the light emitting diode LD4 (as shown in FIG. 10A), or only turns on the light emitting diode LD4 (as shown in FIG. 10B) to calculate a relative distance from the obstacle according to an area of the bright region BA in the image, which does not contain the line pattern T1. The normal mode is returned to turn on the laser light source LD3 again till the cleaning robot 100' turns its direction, i.e. the transparent obstacle no longer within the FOV of the image sensor 13. Or, when identifying that the SNR of the image containing the line pattern T1 exceeds the predetermined threshold range, the processor 15 selects to turn on the laser light source LD3 after turning on the light emitting diode LD4 for a predetermined time interval to identify the relation between the SNR of the image containing the line pattern T1 with respect to the predetermined threshold range to determine whether to turn on the light emitting diode LD4 continuously.

In addition, the embodiment of FIG. 8 is combinable to the above embodiments in FIG. 2, FIGS. 6A-6B and FIG. 7 to have functions of identifying a transparent obstacle, constructing 2D depth information and maintaining a wall distance. Different functions are realized as long as the processor 15 processes images captured corresponding to different light sources being turned on.

As mentioned above, the conventional cleaning robot can only detect one-dimensional distance information but unable to detect the appearance of an obstacle. Furthermore, the conventional cleaning robot uses multiple sensors to detect a wall distance to have the problem of the existence of dead zones. Accordingly, the present disclosure further provides a cleaning robot (e.g., FIGS. 1-2) and an operating method thereof (e.g., FIG. 5) capable of detecting two-dimensional depth information and calculating a wall distance using images captured by a same image sensor so as to improve the user experience.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A cleaning robot, comprising:
a first diffractive optical element;
a first light source configured to project a line pattern through the first diffractive optical element;
a second diffractive optical element;
a second light source configured to project a speckle pattern through the second diffractive optical element;
an image sensor configured to acquire an image of the line pattern and an image of the speckle pattern; and
a processor configured to identify whether there is an obstacle according to the image of the line pattern, and turn on the first light source but turn off the second light source when identifying no obstacle in the image of the line pattern.

2. The cleaning robot as claimed in claim 1, wherein the line pattern is within a region of the speckle pattern.

3. The cleaning robot as claimed in claim 2, wherein
the first light source and the second light source are turned on simultaneously, and
a dominant wavelength of the first light source is different from that of the second light source.

4. The cleaning robot as claimed in claim 2, wherein the first light source and the second light source are turned on sequentially.

5. The cleaning robot as claimed in claim 1, wherein the line pattern is outside of a region of the speckle pattern.

6. The cleaning robot as claimed in claim 5, wherein the first light source and the second light source are turned on simultaneously or sequentially.

7. The cleaning robot as claimed in claim 1, wherein a projected angle of the line pattern is different from that of the speckle pattern.

8. The cleaning robot as claimed in claim 1, wherein the processor is further configured to
identify an appearance of the obstacle according to the image of the speckle pattern.

9. The cleaning robot as claimed in claim 8, wherein the processor is further configured to
identify a distance from the obstacle according to the image of the line pattern, and
control the cleaning robot to turn to move in a direction parallel to the obstacle when the distance is identical to a predetermined distance.

10. The cleaning robot as claimed in claim 9, wherein the image sensor comprises a linear pixel array, and
when the cleaning robot is moving parallel to the obstacle, the processor is further configured to control the cleaning robot to maintain the predetermined distance to move parallel to the obstacle according to an image size of the obstacle detected by the linear pixel array.

11. A cleaning robot, comprising:
a first diffractive optical element;
a first light source configured to project a line pattern through the first diffractive optical element;
a first image sensor configured to capture an image of the line pattern;
a second diffractive optical element;
a second light source configured to project a speckle pattern through the second diffractive optical element;
a second image sensor configured to capture an image of the speckle pattern; and
a processor configured to identify an obstacle according to the image of the line pattern, and turn off the second light source and the second image sensor when no obstacle is identified in the image of the line pattern.

12. The cleaning robot as claimed in claim 11, wherein
the first light source and the second light source are turned on sequentially, and
the line pattern is within or outside of a region of the speckle pattern.

13. The cleaning robot as claimed in claim 11, wherein
the first light source and the second light source are turned on simultaneously,
the line pattern is within a region of the speckle pattern, and
a dominant wavelength of the first light source is different from that of the second light source.

14. The cleaning robot as claimed in claim 11, wherein the processor is coupled to the first image sensor and the second image sensor, and further configured to
identify an appearance of the obstacle according to the image of the speckle pattern.

15. An operating method of a cleaning robot, the cleaning robot comprising a light source, a diffractive optical element, an image sensor and a processor, the light source projecting a line pattern through the diffractive optical element, the operating method comprising:
projecting a line pattern toward a first direction when the cleaning robot moves toward an obstacle;
calculating, by the processor, a relative distance from the obstacle according to a first image of the line pattern captured by the image sensor;
controlling, by the processor, the cleaning robot to turn to move parallel to the obstacle when the relative distance is identical to a predetermined distance;
projecting the line pattern toward a second direction when the cleaning robot moves parallel to the obstacle; and
maintaining, by the processor, a parallel distance between the cleaning robot and the obstacle to the predetermined distance according to a second image of the line pattern captured by the image sensor.

16. The operating method as claimed in claim 15, wherein the image sensor comprises a linear pixel array, and the operating method further comprises:

identifying, by the processor, whether the parallel distance is identical to the predetermined distance according to an image size of the obstacle detected by the linear pixel array.

17. The operating method as claimed in claim 15, wherein the image sensor has a wide-angle lens to cause a field of view of the image sensor to be larger than a diameter of the cleaning robot.

18. The operating method as claimed in claim 15, wherein the cleaning robot further comprises another light source and another diffractive optical element, and the operating method further comprises:

projecting, by the another light source, a speckle pattern through the another diffractive optical element.

19. A cleaning robot, comprising:

a diffractive optical element;

a laser light source configured to project a line pattern toward a moving direction through the diffractive optical element;

a light emitting diode configured to illuminate light with an emission angle toward the moving direction;

an image sensor configured to acquire an image with a field of view toward the moving direction; and a processor configured to control lighting of the laser light source and the light emitting diode, wherein when identifying that a signal-to-noise ratio of the image containing the line pattern exceeds a threshold range, the processor is configured to identify a distance of an obstacle according to an area of a bright region in the image which is acquired when the light emitting diode is lighting.

20. The cleaning robot as claimed in claim 19, wherein when identifying that the signal-to-noise ratio of the image containing the line pattern is within the threshold range, the processor is configured to turn on the laser light source and turn off the light emitting diode.

21. The cleaning robot as claimed in claim 19, wherein
the laser light source is configured to project the line pattern toward the moving direction with a dip angle, and
the light emitting diode is configured to illuminate the light right ahead of the moving direction.

22. A cleaning robot, comprising:

a light source module configured to provide a line pattern and a speckle pattern;

an image sensor configured to acquire an image of the line pattern and an image of the speckle pattern; and a processor configured to identify whether there is an obstacle according to the image of the line pattern, and identify a distance from the obstacle according to the image of the line pattern, and control the cleaning robot to turn to move in a direction parallel to the obstacle when the distance is identical to a predetermined distance.

* * * * *